(12) United States Patent  (10) Patent No.: US 12,208,977 B2
Otake  (45) Date of Patent: Jan. 28, 2025

(54) RAIN-GUARD DEVICE FOR NOZZLE

(71) Applicant: IHI Transport Machinery Co., Ltd, Tokyo (JP)

(72) Inventor: Yasuhiro Otake, Tokyo (JP)

(73) Assignee: IHI TRANSPORT MACHINERY CO., LTD, Tokyo (JP)

( * ) Notice: Subject to any disclaimer, the term of this patent is extended or adjusted under 35 U.S.C. 154(b) by 279 days.

(21) Appl. No.: 17/636,168

(22) PCT Filed: Jan. 15, 2020

(86) PCT No.: PCT/JP2020/001084
§ 371 (c)(1),
(2) Date: Sep. 14, 2022

(87) PCT Pub. No.: WO2021/144884
PCT Pub. Date: Jul. 22, 2021

(65) Prior Publication Data
US 2023/0020035 A1   Jan. 19, 2023

(51) Int. Cl.
B63B 19/18 (2006.01)
B65G 67/60 (2006.01)

(52) U.S. Cl.
CPC .......... B65G 67/606 (2013.01); B63B 19/18 (2013.01); *B65G 2203/0283* (2013.01); *B65G 2203/041* (2013.01); *B65G 2814/0397* (2013.01)

(58) Field of Classification Search
CPC ............ B65G 2814/0397; B63B 19/18; B63B 17/023
See application file for complete search history.

(56) References Cited

U.S. PATENT DOCUMENTS

| 8,818,586 | B2 | 8/2014 | Pereira | |
| 11,505,284 | B2* | 11/2022 | Kawasaki | B63B 19/24 |
| 2014/0331911 | A1 | 11/2014 | Rudiger Lilenthal | |
| 2019/0002059 | A1* | 1/2019 | Salles | B65G 69/00 |
| 2020/0148477 | A1* | 5/2020 | Edwards | B65G 41/008 |

FOREIGN PATENT DOCUMENTS

| AT | 502181 B1 | 2/2007 |
| CN | 201534723 U | 7/2010 |
| CN | 204624744 U | 9/2015 |
| CN | 204646024 U | 9/2015 |
| CN | 106226119 A | 12/2016 |
| FR | 2457214 A1 | 5/1980 |

(Continued)

OTHER PUBLICATIONS

Translation of EP-0002377-A1 (Year: 1978).*

(Continued)

*Primary Examiner* — Jason K Niesz
(74) *Attorney, Agent, or Firm* — McCormick, Paulding & Huber PLLC

(57) ABSTRACT

The present disclosure provides a rain-guard device for a nozzle that can prevent the cargo being loaded aboard from getting wet with rainwater. A nozzle rain-guard device 30 has a nozzle cover 31, which covers an outer periphery of a nozzle 8 of a shiploader 1, and a chute cover, which is provided in a lower end part of the nozzle 8, and covers a chute 22 provided on a hatch opening 13 from above.

15 Claims, 7 Drawing Sheets

(56) References Cited

FOREIGN PATENT DOCUMENTS

| | | | |
|---|---|---|---|
| JP | 5451171 | A | 4/1979 |
| JP | 54119177 | A | 8/1979 |
| JP | 60197533 | A1 | 10/1985 |
| JP | 06271087 | A | 9/1994 |
| JP | H10212033 | A | 8/1998 |
| JP | 3179239 | B2 | 6/2001 |
| JP | 2019085236 | A | 6/2019 |
| NO | 0002377 | A1 * | 12/1978 ........... B63B 17/023 |
| WO | 2014024563 | A1 | 2/2014 |
| WO | 2019092936 | A1 | 5/2019 |

OTHER PUBLICATIONS

International Search Report for PCT/JP2020/001084 Dated Mar. 24, 2020.

First Office Action for Chinese Patent Application No. 202080052585.5, dated Oct. 28, 2023 and its English translation.

* cited by examiner

RAIN-GUARD DEVICE FOR NOZZLE

CROSS-REFERENCE TO RELATED APPLICATIONS

This application is a National Stage application of International Patent Application No. PCT/JP2020/001084, filed on Jan. 15, 2020, which is hereby incorporated by reference in its entirety.

BACKGROUND

Technical Field

The present disclosure relates to a rain-guard device for a nozzle, which, when loading cargo such as grains or the like aboard with a shiploader, prevents the cargo from getting wet from rainfall, prevents the cargo being loaded aboard from scattering in the wind, and so forth.

Background Art

As for a device for preventing cargo being loaded aboard with a shiploader from getting wet from rainfall, the one described in Japanese Unexamined Patent Application Publication No. 2019-85236 is known.

The rain-guard device described in Japanese Unexamined Patent Application Publication No. 2019-85236 has a lid member for closing a hatch opening, and a chute provided on the hatch opening. The chute is provided on a flat base part that rests between sliding hatch covers, receives the cargo that is discharged from a nozzle, and throws the cargo into a hold.

SUMMARY

Now, with the rain-guard device described in Japanese Unexamined Patent Application Publication No. 2019-85236, a rain cover for the chute is attached to the nozzle's end part, to prevent rainfall from seeping in between the nozzle and the chute. However, the nozzle is formed by joining a number of nozzle tubes having varying diameters, in the vertical direction, so that it can expand and contract. To be more specific, this nozzle is formed by inserting part of the upper nozzle tube into the lower nozzle tube.

Consequently, when the shiploader is used in rainy weather, rainwater may seep into the nozzle through the gap between the nozzle tubes.

Furthermore, some nozzles are made of conductors such as metal. If a nozzle like this comes into contact with a chute made of a conductor, a spark might be produced, and be a source of ignition for dust explosions.

The present disclosure has been created in view of these circumstances, and its object is to provide a rain-guard device for a nozzle that can prevent the cargo being loaded aboard from getting wet with rainwater.

According to one aspect of the present disclosure, a rain-guard device for a nozzle having a nozzle cover, which covers an outer periphery of a nozzle of a shiploader, and a chute cover, which is provided in a lower end part of the nozzle, and covers the chute provided on a hatch opening from above, is provided.

Preferably, the nozzle cover has a fixed part, which is fixed liquid-tight to an outer peripheral part of the nozzle, a bellows part, which is provided in the fixed part to extend downward, and formed so as to expand and contract in a vertical direction, and a joining part, which is provided at a lower end of the bellows part, and connected liquid-tight to the chute cover.

Preferably, the chute cover is detachably provided in the lower end part of the nozzle and the nozzle cover, and the rain-guard device for the nozzle has a lifting device, which lifts a lower end of the nozzle cover.

Preferably, the chute cover has an insulator on its surface.

Preferably, a guide cylinder part for guiding cargo discharged from the nozzle to the chute is formed in the chute cover.

Preferably, a seal member is provided to seal between the chute and the chute cover.

Preferably, the seal member has a fixed base part, which is provided in the chute, and a flexible part, which is provided in the fixed base part to extend outward along a radial direction of the chute.

Preferably, a landmark part, which is hung from an outer peripheral part of the chute cover, and a target, which is placed around the chute for positioning the landmark part, are provided.

Preferably, a camera for photographing the chute is provided inside the chute cover, and a display for showing an image photographed by the camera to an operator of the shiploader is connected to the camera by wire or wirelessly.

According to the present disclosure, it is possible to prevent the cargo being loaded aboard from getting wet with rainwater.

DETAILED DESCRIPTION

Figure 1:
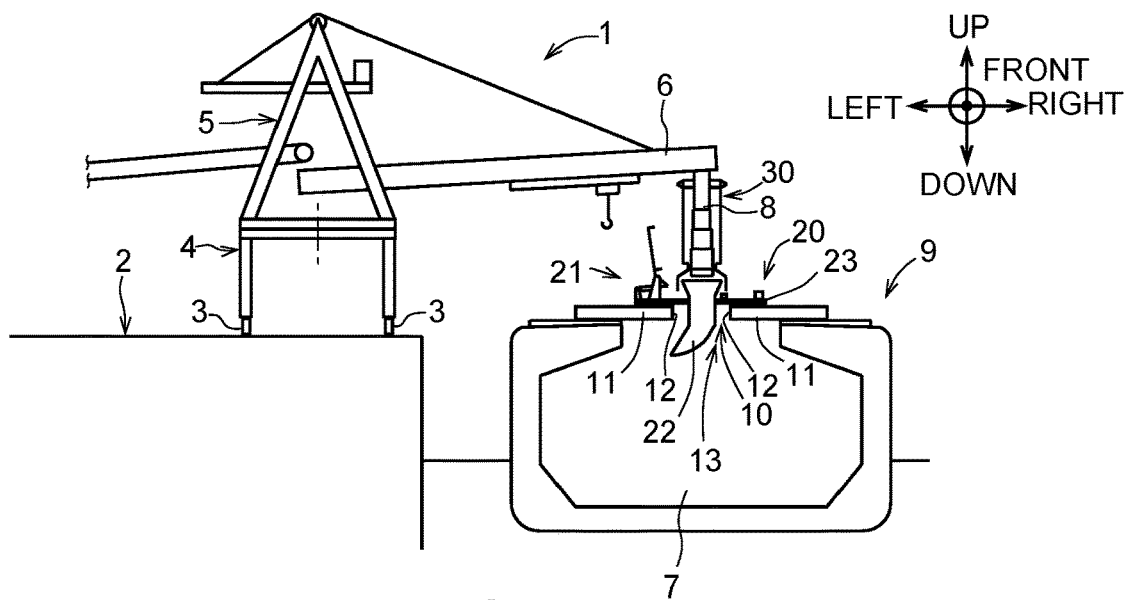
FIG. 1 is a schematic explanatory diagram of a shiploader.
Figure 2:
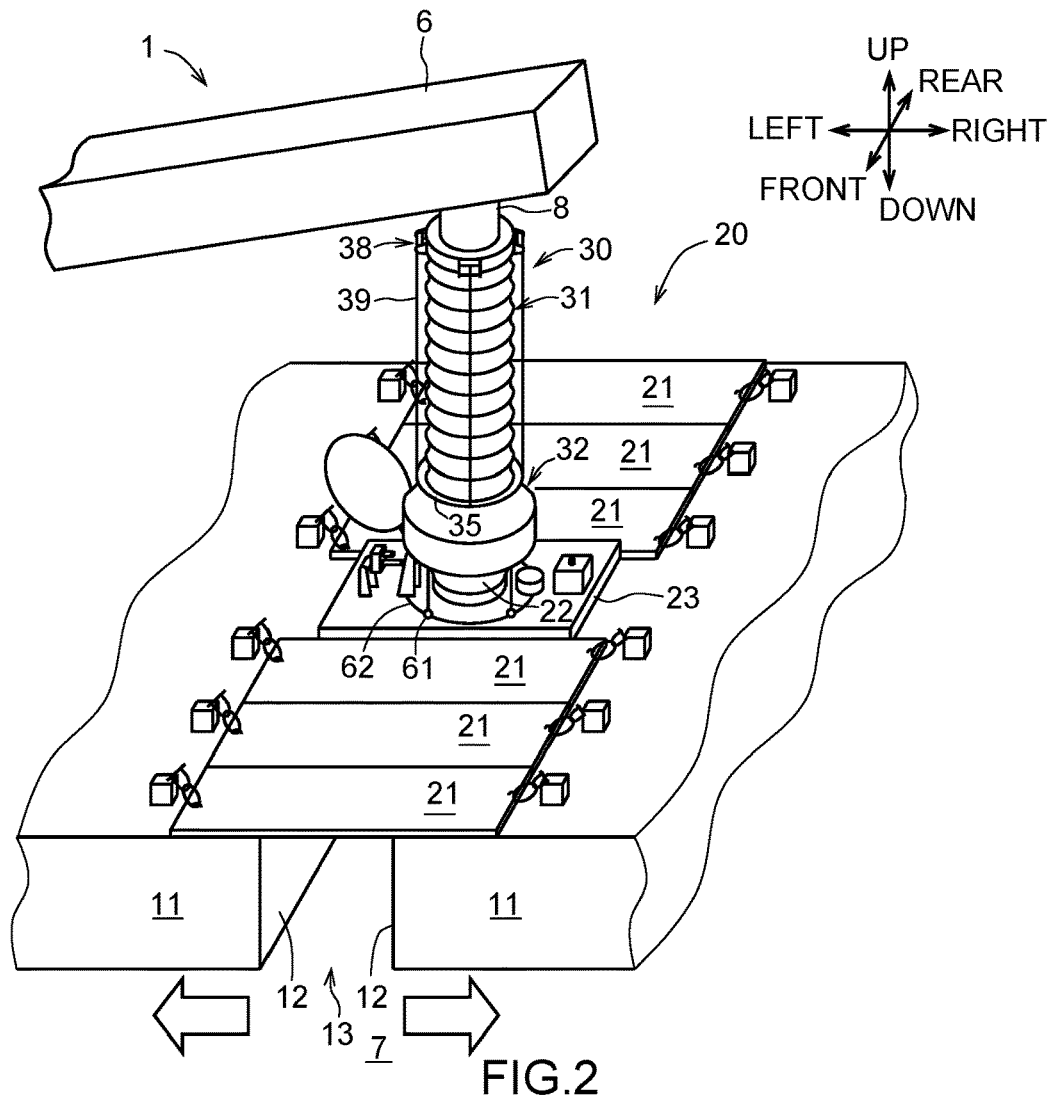
FIG. 2 is a perspective view of a main part in FIG. 1.
Figure 3:
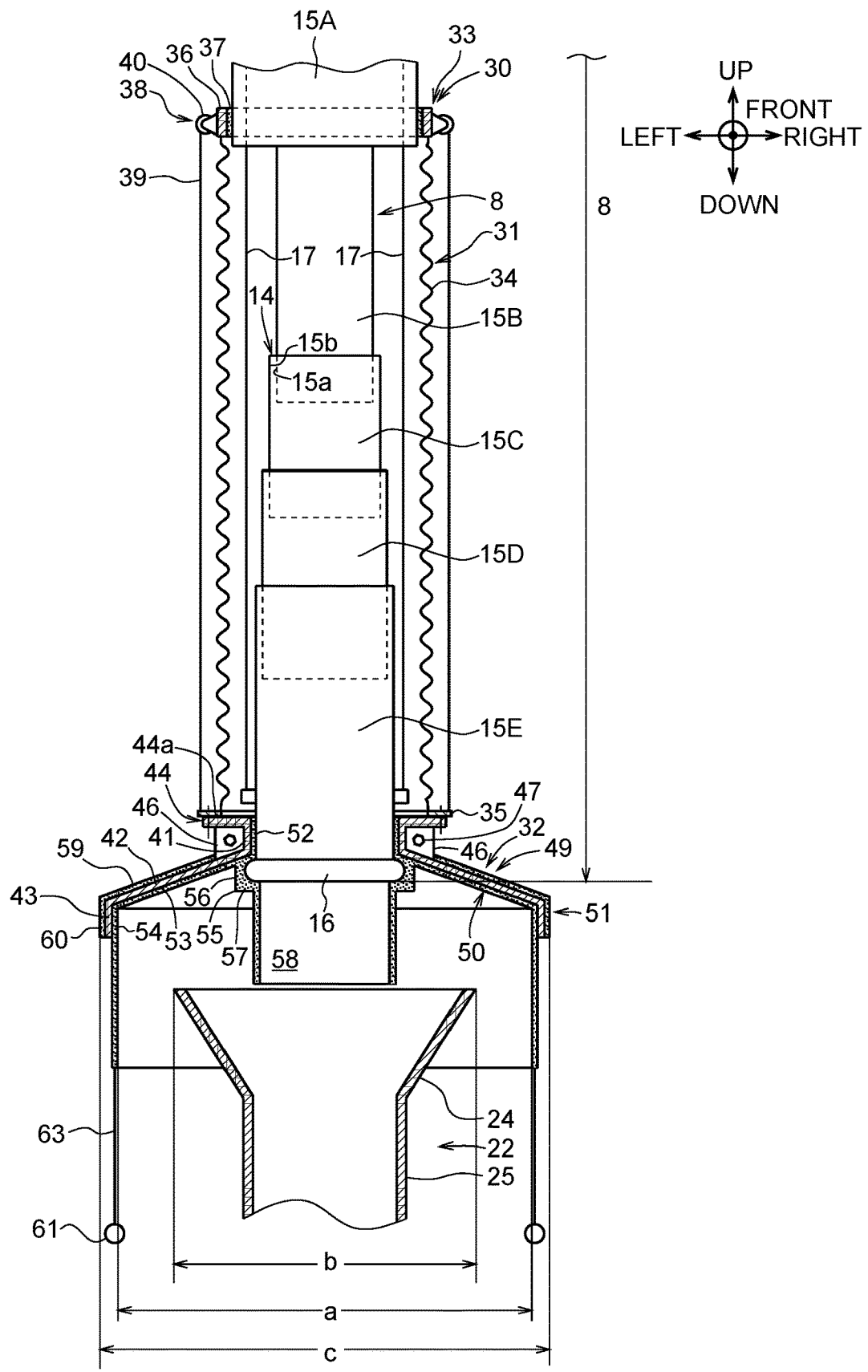
FIG. 3 is a front cross-sectional view of a rain-guard device for a nozzle according to an embodiment of the present disclosure.

Now, embodiments of the present disclosure will be described below with reference to the accompanying drawings. FIG. 1 is a schematic front view of a shiploader, a vessel and a rain-guard device for loading. FIG. 2 is a perspective view of a main part in FIG. 1. FIG. 3 is a front cross-sectional view of a rain-guard device for a nozzle according to the present embodiment. Note that, for ease of description, with the present embodiment, the directions in which the sliding hatch covers open and close are left and right directions, and directions that are perpendicular and at right angles to these left and right directions are front and rear directions.

First, the shiploader and the vessel will be described.

As shown in FIG. 1, a shiploader 1 has a traveling part 4, which travels on a rail 3 laid on the quay 2, a rotating part 5, which is provided on the traveling part 4 in a rotatable manner, a boom 6, which is provided on the rotating part 5 so as to be raised and lowered, and a nozzle 8, which hangs from the tip of the boom 6, and which supplies cargo such as grains or the like into a hold 7. The boom 6 is provided with a conveyor (not shown) for transferring the cargo from the quay 2 to the nozzle 8. Note that the cargo is not limited to grains. The cargo may be other bulk materials that are preferred not to get wet in the rain.

The vessel 9 is a cargo ship. The vessel 9 has a hold 7 with an upper opening 10, and sliding hatch covers 11, which open and close the upper opening 10. A pair of sliding hatch covers 11 are provided opposite each other on both left and right sides of the vessel 9, and, furthermore, provided so as to be slidable in left and right directions (directions along the vessel's width). That is, the sliding hatch covers 11 are designed to open left and right, close the upper opening 10 by pressing the opposing ends 12 against each other, and opens the upper opening 10 by separating the opposing ends 12 from each other. The sliding hatch covers 11 are formed so as to open the upper opening 10 at an arbitrary distance. Hereinafter, the opening that is formed when the sliding hatch covers 11 open will be referred to as a "hatch opening 13". Note that the sliding hatch covers 11 may be provided so as to be slidable in front and rear directions with respect to the vessel 9.

As shown in FIG. 1, FIG. 2 and FIG. 3, a rain-guard device 20 for loading has a lid member 21, which rests between the sliding hatch covers 11 to close the hatch opening 13, and a chute 22, which is provided on the hatch opening 13. The chute 22 is provided so as to vertically penetrate a flat base part 23, which rests between the sliding hatch covers 11. The chute 22 is formed in a cylindrical shape, and extending in the vertical direction.

The chute 22 has a cargo receiving part 24, which is formed in the upper end part and receives the cargo discharged from the nozzle 8, and a passage part 25 for passing the cargo received in the cargo receiving part 24 to the hold 7. The cargo receiving part 24 is formed in the shape of a funnel, where the diameter expands from the lower end toward the upper end. The passage part 25 is formed to extend downward from the lower end of the cargo receiving part 24, and, furthermore, formed in a cylindrical shape, where the inner diameter is substantially constant. The rain-guard device 20 for loading can close the hatch opening 13, so that, even when the work of loading cargo aboard is carried out in rainy weather, it is possible to prevent, substantially, the cargo from getting wet with rainwater.

However, there are other places where rainwater might seep in, and there is still room for improvement in measures against rainwater. To be more specific, the nozzle 8 of the shiploader 1 has a gap 14 that is open upward, and rainwater might seep in from this gap 14.

This gap 14 will be described. The nozzle 8 is formed in a telescopic shape so that it can expand and contract. In addition, the nozzle 8 is formed by joining a number of types of nozzle tubes 15A to 15E, which have different inner and outer diameters, in the vertical direction. The nozzle tubes 15B to 15E, not including the uppermost nozzle tube 15A, are arranged so that their diameters grow bigger from the upper end to the lower end.

Furthermore, except for the combination of the uppermost nozzle tube 15A and its lower nozzle tube 15B, in all of the combination of the nozzle tubes 15B and 15C, the combination of the nozzle tubes 15C and 15D, and the combination of the nozzle tubes 15D and 15E, the lower part of the upper nozzle tube is inserted into the lower nozzle tube.

Consequently, for example, the gap 14 is formed between the outer peripheral surface 15a of the upper nozzle tube 15B and the inner peripheral surface 15b of the lower nozzle tube 15C, and, furthermore, is open upward. The gap 14 communicates with the inside of the nozzle tube 15C, and the rain that falls on the gap 14 seeps into the inside of the lower nozzle tube 15C. Note that the uppermost nozzle tube 15A has the largest diameter. Also, the next nozzle tube 15B is inserted in and connected with the uppermost nozzle tube 15A.

In addition, when the rain-guard device 20 for loading is used, the nozzle 8 is brought close to the chute 22. However, the nozzle 8 can be made of a conductor such as metal, and, if the nozzle 8 made of a conductor contacts the chute 22 made of a conductor, a spark might be produced. Loading cargo such as grains and so forth aboard is likely to blow dust into the air, and sparks could be a source of ignition for dust explosions.

So, the rain-guard device 30 for the nozzle according to the present embodiment has a function of preventing water from seeping into the gap 14 in the nozzle 8, and, furthermore, has a function of preventing sparks from being produced when the nozzle 8 and the chute 22 contact each other. Also, the rain-guard device 30 for the nozzle according to the present embodiment has a function of preventing dust inside the nozzle 8 from going out of the gap 14 to the outside, and, furthermore, has a function of preventing dust from going out between the nozzle 8 and the chute 22.

Now, the rain-guard device 30 for a nozzle according to the present embodiment, and the nozzle 8, to which the nozzle rain-guard device 30 is attached, will be described below.

The nozzle 8 is formed in a substantially cylindrical shape. A collar part 16 for reinforcement or the like is formed in the lower end part of the nozzle 8. The collar part 16 is formed by making the outer diameter of the nozzle tube 15E bigger, which is located at the lower end of the nozzle 8, and, furthermore, formed in a semicircular cross section.

Also, the nozzle tube 15E, located at the lower end of the nozzle 8, is connected with a wire 17 for hanging the nozzle 8 so as to move up and down. The wire 17 is wound by a winch (not shown), provided at the boom 6, in a way that the wire 17 can be wound and unwound.

The nozzle rain-guard device 30 has a nozzle cover 31, which covers the outer periphery of the nozzle 8, and a chute cover 32, which is provided in the lower end part of the nozzle 8, and covers the chute 22 from above.

The nozzle cover 31 has a fixed part 33, which is fixed liquid-tight to the outer peripheral part of the nozzle 8, a bellows part 34, which extends downward from the fixed part 33, and is formed so as to expand and contract in the vertical direction, and a joining part 35, which is provided at the lower end of the bellows part 34, and joined liquid-tight to the chute cover 32.

The fixed part 33 is attached to the uppermost nozzle tube 15A. The fixed part 33 has a belt part 36, which is formed in an arcuate band shape along the outer periphery of the nozzle 8, a fastening part (not shown), which is provided at one end of the belt part 36, and draws the other end of the belt part 36 to one end side, to fasten the belt part 36 to the nozzle 8, and a water-blocking part 37, which is provided on the inner peripheral surface of the belt part 36. The belt part 36 is made of a flexible material such as metal. The water-blocking part 37 is made of a water-blocking material such as rubber, and blocks water between the belt part 36 and the nozzle 8.

The bellows part 34 is made of a flexible and water-proof material, so that it can expand and contract vertically. The bellows part 34 is made from, for example, water-proof canvas.

Figure 7:
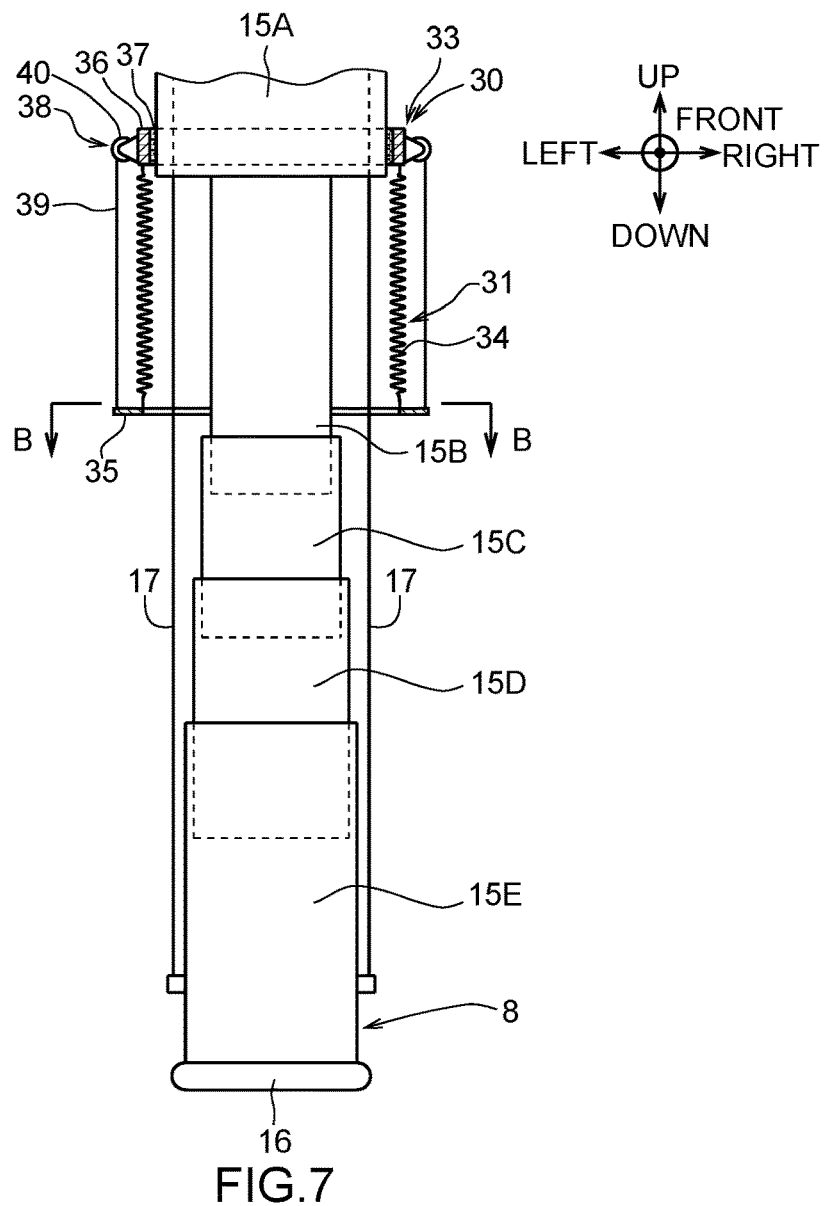
FIG. 7 is a front view to show a state in which a nozzle cover is folded.
Figure 8:
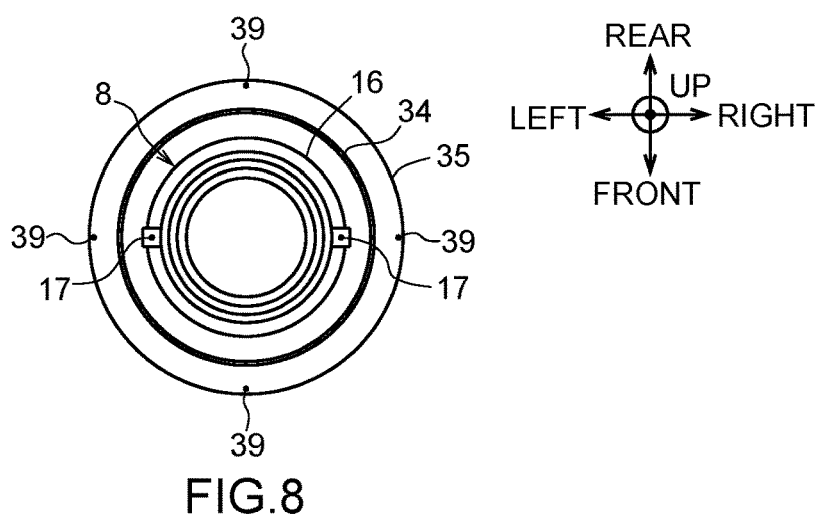
FIG. 8 is a cross-sectional view taken along the B-B line in FIG. 7.

As shown in FIG. 7 and FIG. 8, the joining part 35 is formed in an annular flat shape, and is fastened liquid-tight to a flange part 44 of the chute cover 32, which will be described later. Also, a wire 39 of a lifting device 38, which lifts the nozzle cover 31, is connected to the joining part 35. The lifting device 38 has an electric winch 40, which winds the wire 39 in a way that the wire 39 can be wound and unwound. The electric winch 40 is provided in the fixed part 33. Note that the electric winch 40 may be attached to the nozzle 8. In this case, the electric winch 40 may be attached to the nozzle tube 15A above the fixed part 33. When the electric winch 40 is attached to the nozzle tubes 15B to 15E below the fixed part 33, the electric winch 40 may be placed within the bellows part 34, and the wire 39 may be connected to the joining part 35 in the bellows part 34. Also, the electric winch 40 may be attached to the boom 6.

As shown in FIG. 3, the chute cover 32 has a mounting base part 41, which is formed in a cylindrical shape, and detachably attached to the outer periphery of the nozzle 8, an umbrella part 42, which is formed to extend radially outward from the lower end of the mounting base part 41, a lower extension part 43, which is formed in a cylindrical shape, and which extends downward from the outer peripheral end of the umbrella part 42, and a flange part 44, which is formed to extend radially outward from the upper end of the mounting base part 41. The umbrella part 42 is inclined to go downward as the umbrella part 32 extends further outward along the radial direction. The flange part 44 is formed in an annular shape to surround the outer periphery of the nozzle 8, and, furthermore, formed in a flat shape. The upper surface 44a of the flange part 44 is formed into a smooth flat shape, and is detachably fastened to the joining part 35 of the nozzle cover 31.

Figure 4:
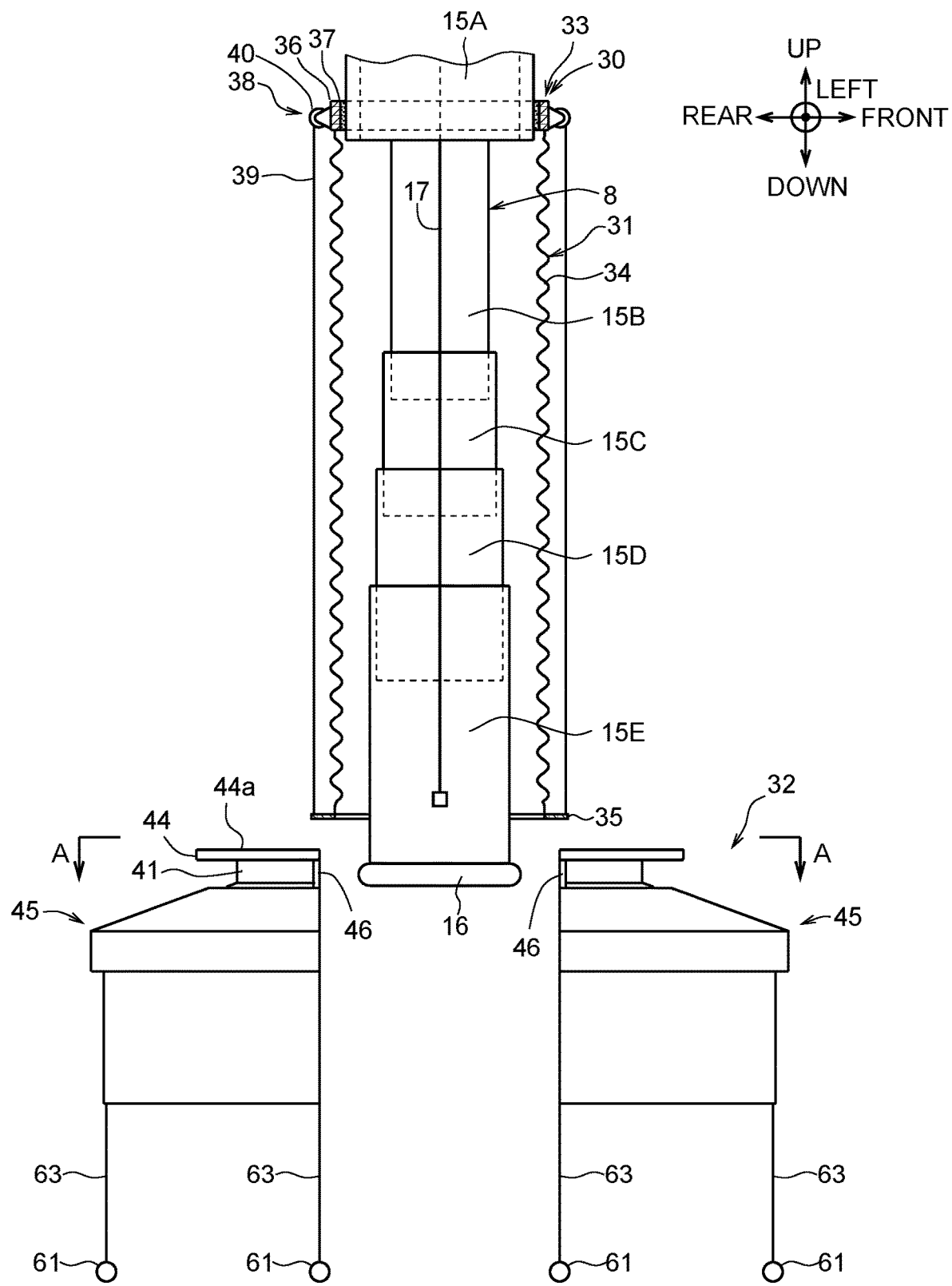
FIG. 4 is a side view to show a state in which a chute cover is removed from the nozzle.
Figure 5:
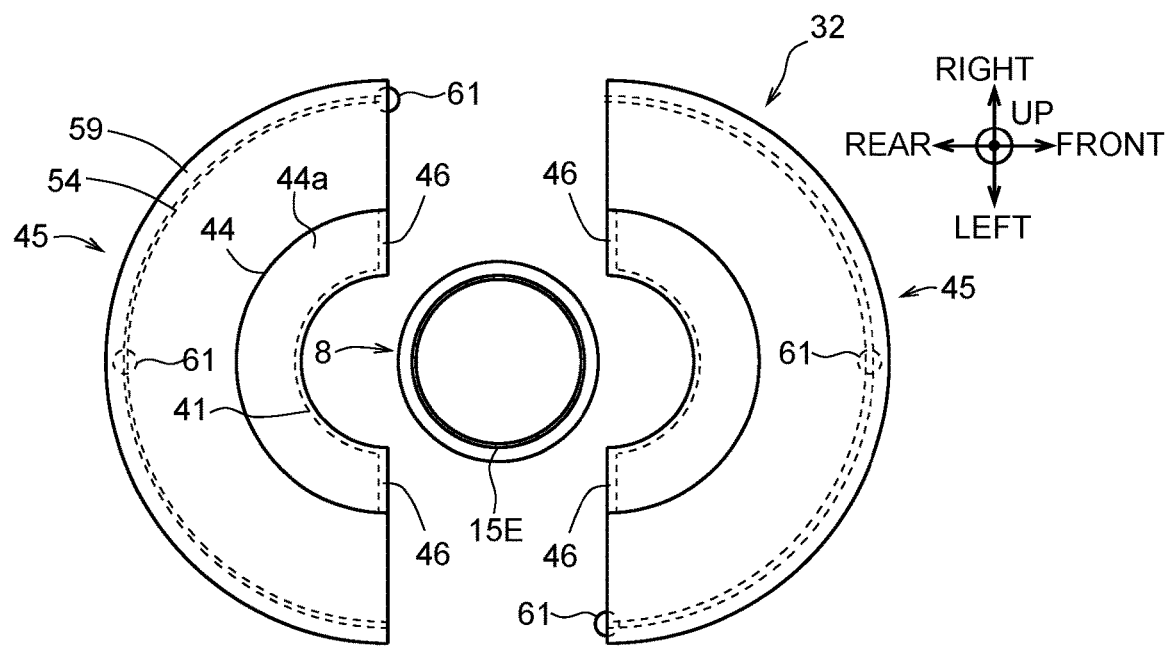
FIG. 5 is a cross-sectional view taken along the A-A line in FIG. 4.

Furthermore, as shown in FIG. 4 and FIG. 5, the chute cover 32 is formed so that it can be divided in the horizontal direction. To be more specific, the chute cover 32 is formed so that it can be divided into two parts, for example. In each of the divided pieces 45 formed by dividing the chute cover 32, a vertical flange part 46 for fastening the divided pieces 45 with each other detachably. Accordingly, the chute cover 32 can be also attached to an existing nozzle 8. The vertical flange parts 46 are formed in a flat shape that extends radially outward from the mounting base part 41, and, furthermore, extends vertically. The opposing vertical flange parts 46 are fastened with each other, with bolts 47 (see FIG. 3) and nuts (not shown). The divided piece 45 is made of a structural material such as metal. In addition, each divided piece 45 includes a divided part of the mounting base part 41, the umbrella part 42, the lower extension part 43 and the flange part 44.

Figure 6:
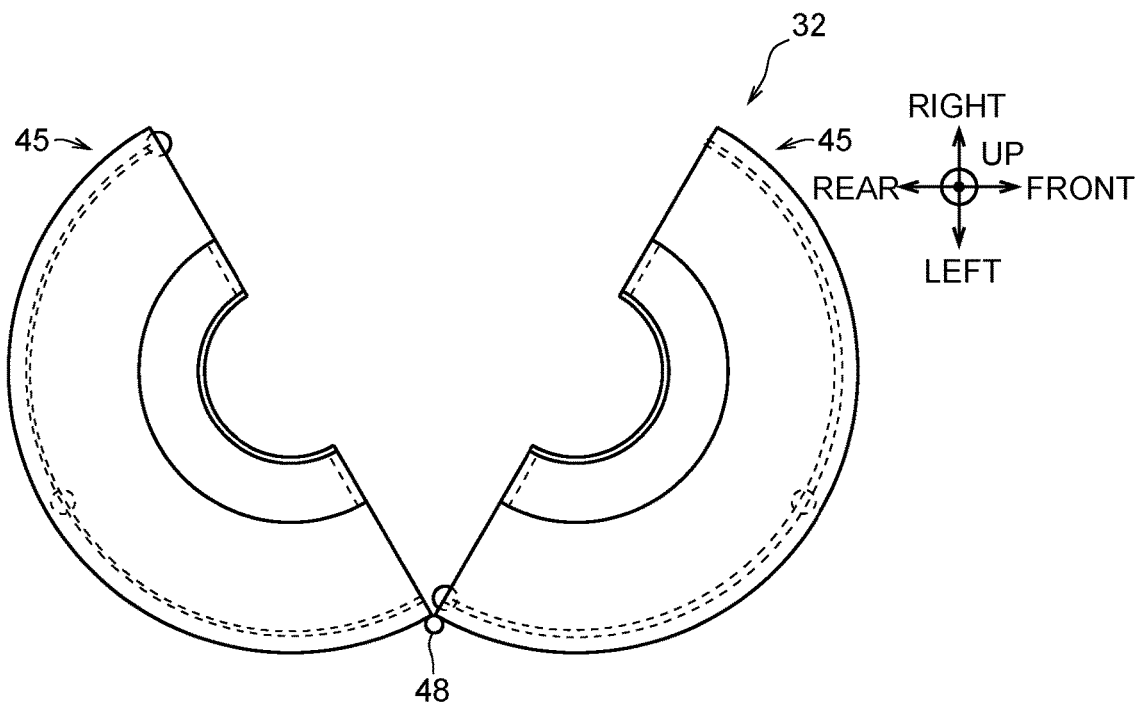
FIG. 6 is a top view to show a variation of the chute cover.

Note that the chute cover 32 may be formed so that it can open and close in the horizontal direction, as shown in FIG. 6. To be more specific, the chute cover 32 may be formed so that divided pieces 45 are joined, at the outermost peripheral position, in a way they are rotatable about a shaft 48, which extends vertically. Furthermore, the chute cover 32 may be formed so as to be divided into three or more pieces.

Also, as shown in FIG. 3, the chute cover 32 has an insulator 49 on its surface. To be more specific, the insulator 49 has an inner surface insulating part 50, provided on the inner surface of each divided piece 45, and an outer surface insulating part 51, provided on the outer surface of each divided piece 45.

The inner surface insulating part 50 and the outer surface insulating part 51 are made of an insulator. To be more specific, the insulator forming the inner surface insulating part 50 and the outer surface insulating part 51 is made of soft resin such as rubber. By this means, the inner surface insulating part 50 and the outer surface insulating part 51 also function as cushioning materials. The inner surface insulating part 50 prevents or suppresses sparks from being produced between the nozzle 8 and the chute 22, or between the chute cover 32 and the chute 22. The outer surface insulating part 51 prevents or suppresses sparks from being produced between the chute cover 32 and the equipment around the chute 22.

The inner surface insulating part 50 has an insulating part 52 inside the base part, which covers the inner peripheral surface of the mounting base part 41, an insulating part 53 inside the umbrella part, which covers the inner surface of the umbrella part 42, an insulating part 54 inside the lower extension part, which covers the inner peripheral surface of the lower extension part 43, and a nozzle insulating part 55, which covers the nozzle 8 located below the mounting base part 41 of the chute cover 32. The insulating part 52 inside the base part, the insulating part 53 inside the umbrella part, the insulating part 54 inside the lower extension part, and the nozzle insulating part 55 are made of the same material and formed in one piece. The insulating part 52 inside the base part is stuck to the inner peripheral surface of the mounting base part 41. The insulating part 53 inside the umbrella part is stuck to the inner surface of the umbrella part 42. The insulating part 54 inside the lower extension part is stuck to the inner peripheral surface of the lower extension part 43, and, furthermore, formed to extend downward from the lower extension part 43.

Figure 9:
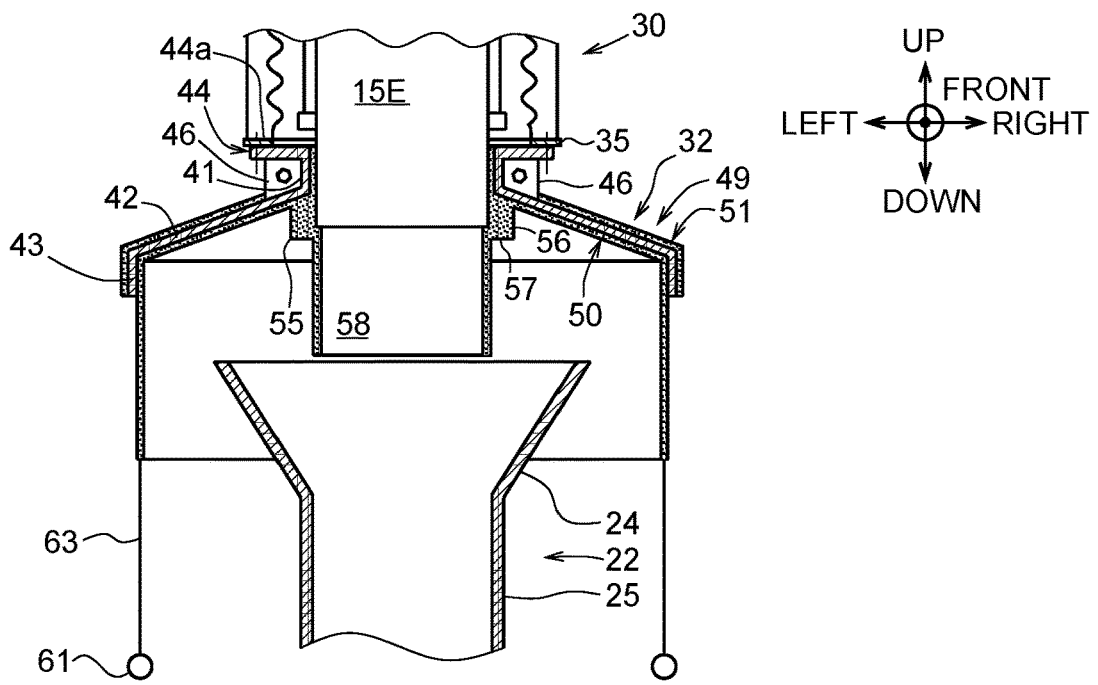
FIG. 9 is a front cross-sectional view of a main part of a rain-guard device for a nozzle, according to another embodiment.

Furthermore, the insulating part 54 inside the lower extension part is formed to extend downward from a guide cylinder part 58, which will be described later. The inner diameter a of the insulating part 54 inside the lower extension part is set bigger than the outer diameter b of the upper end of the chute 22. The nozzle insulating part 55 has an outer peripheral covering part 56, which covers the outer peripheral surface of the nozzle 8, and a lower end covering part 57, which covers the lower end surface of the nozzle 8. Note that, although the collar part 16 is formed in the lower end part of the nozzle 8, this is by no means limiting. As shown in FIG. 9, the nozzle 8 may not have the collar part 16. In this case, the inner peripheral surface of the outer peripheral covering part 56 may be formed linear in the vertical direction.

Furthermore, in the chute cover 32, a guide cylinder part 58 for guiding the cargo discharged from the nozzle 8 to the chute 22 is formed. The guide cylinder part 58 is formed in a cylindrical shape and formed to be coaxial with the nozzle 8, and, furthermore, has the same inner diameter as the inner diameter of the lower end of the nozzle 8. Also, the guide cylinder part 58 is made of an insulating material. To be more specific, the guide cylinder part 58 is made of the same material as the nozzle insulating part 55, and, furthermore, formed in one piece with the nozzle insulating part 55. Note that the inner diameter of the guide cylinder part 58 may be set bigger than the inner diameter of the lower end of the nozzle 8 and smaller than the inner diameter of the passage part 25 of the chute 22.

The outer surface insulating part 51 has an insulating part 59 outside the umbrella part, which covers the outer surface of the umbrella part 42, and an insulating part 60 outside the lower extension part, which covers the outer peripheral surface of the lower extension part 43. The insulating part 59 outside the umbrella part and the insulating part 60 outside the lower extension part are made of the same material in one piece. The insulating part 59 outside the umbrella part is stuck to the outer surface of the umbrella part 42. The insulating part 60 outside the lower extension part is stuck to the outer peripheral surface of the lower extension part 43, and, furthermore, the height of the lower end is set to be the same as that of the lower extension part 43.

In addition, as shown in FIG. 2 and FIG. 3, the nozzle rain-guard device 30 has landmark parts 61, which are hung from the outer periphery of the chute cover 32, and a target 62, which is placed around the chute 22 for positioning the landmark parts 61. A landmark part 61 is formed with a weight, and is joined with the outer peripheral part of the chute cover 32 (that is, the insulating part 54 inside the lower extension part) with a link 63, which is, for example, a chain, a wire, and/or the like. A number of landmark parts 61 are provided along the circumferential direction of the lower extension part 43. The landmark parts 61 and the links 63 are designed in a prominent color, such as red. The target 62 is formed by coloring the base part 23 around the chute 22. Furthermore, the length of the links 63 is set so that the landmark parts 61 abuts on the base part 23 when the nozzle 8 assumes a height suitable for the work of loading cargo aboard. The target 62 is formed in an annular shape, and formed to be coaxial with the chute 22 and, furthermore, to have the same diameter as the lower extension part 43 of the chute cover 32. The landmark parts 61 are aligned with the target 62, so that the nozzle 8 is arranged coaxially with the chute 22.

If the nozzle 8 is eccentric with respect to the chute 22, the cargo discharged from the nozzle 8 hits the chute 22 unevenly, and the chute 22 shakes harder. However, the shake of the chute 22 can be reduced by arranging the nozzle 8 coaxially with the chute 22.

Next, the operations of the present embodiment will be described.

When the work of loading cargo aboard is performed in rainy weather, the nozzle rain-guard device 30 is attached to the nozzle 8, and the nozzle 8 is located close to and vertically above the chute 22. At this time, the work of attaching the chute cover 32 to the nozzle 8 can be performed manually by a worker on the ground. The positioning of the nozzle 8 is done by watching it from an operator room (not shown) provided in a higher location. To be more specific, the nozzle 8 is moved so that all the landmark parts 61 are placed on the target 62. By this means, the guide cylinder part 58 is placed substantially coaxially with the chute 22, and, furthermore, placed in a position of predetermined height, vertically close to the upper side of the chute 22.

At this time, there is a possibility that the positions of the landmark parts 61 with respect to the target 62 shift significantly, due to waves, wind and so forth, and the nozzle cover 31 hits the chute 22 and equipment provided around the chute 22. However, the inner surface of the umbrella part 42 and the lower extension part 43 is formed with the inner surface insulating part 50, the outer surface of the umbrella part 42 and the lower extension part 43 is formed with the outer surface insulating part 51, and the guide cylinder part 58 is made of an insulator. Consequently, even when the chute cover 32 hits the chute 22 or equipment around the chute 22, it is possible to prevent or suppress sparks from being produced, and prevent or suppress dust explosions. Moreover, the insulator to form the inner surface insulating part 50 and the guide cylinder part 58 is made of soft resin, so that, even when the nozzle cover 31 hits the chute 22 or equipment around the chute 22, it is possible to prevent damaging the nozzle cover 31, the chute 22 and equipment around the chute 22.

Following this, the cargo is loaded into the nozzle 8 from the conveyor (not shown) on the boom 6. The nozzle 8 is arranged substantially coaxially with the chute 22, and guided to the vicinity of the chute 22 by the guide cylinder part 58. Consequently, the cargo is loaded into the chute 22 along the central axis of the chute 22. Then, the cargo flows smoothly, without disordering itself in the chute 22, and the shake produced in the chute 22 can be restrained to a low level.

Furthermore, the outer periphery of the nozzle 8 is covered with the nozzle cover 31, so that it is possible to prevent rainwater from seeping into the nozzle 8 through the gap 14. Also, the nozzle cover 31 is fastened liquid-tight to the chute cover 32. Consequently, the rainwater that trickles down and flows on the outer surface of the nozzle cover 31 flows to the outer surface of the chute cover 32, so that the rainwater is prevented from seeping in the chute cover 32. Furthermore, the outer diameter c of the insulating part 60 outside the lower extension part is bigger than the outer diameter b of the upper end of the chute 22.

Consequently, the rainwater that flows from the lower extension part 43 falls on the base part 23 outside the chute 22, and the rainwater is prevented from falling into the chute 22.

Furthermore, dust is produced inside the nozzle 8, and this dust might leak out of the nozzle 8 through the gap 14. However, the outer periphery of the nozzle 8 is covered with the nozzle cover 31. Furthermore, the upper end of the nozzle cover 31 is closed by the water-blocking part 37 of the fixed part 33 being adhered liquid-tight to the uppermost nozzle tube 15A. Then, the lower end of the nozzle cover 31 is sealed by the joining part 35 that is joined liquid-tight to the chute cover 32. Consequently, it is possible to prevent dust from leaking out of the nozzle cover 31.

Furthermore, the guide cylinder part 58 is separate from the chute 22 upward, and therefore there is a possibility that dust might leak outside from the gap between the nozzle 8 and the chute 22. However, the outer periphery of the chute 22 is covered with the insulating part 54 inside the lower extension part of the chute cover 32. Consequently, even if dust leaks from the gap between the guide cylinder part 58 and the chute 22, the dust passes through the narrow gap between the chute 22 and the insulating part 54 inside the lower extension part, so that it is possible to prevent the dust from scattering around. Then, a small amount of dust that has leaked from between the chute 22 and the insulating part 54 inside the lower extension part flows downward and hits the base part 23 that supports the chute 22. Consequently, the dust's particles adhere to the wet base part 23, so that it is possible to prevent the dust from scattering outside widely.

Also, when carrying out the work of loading cargo aboard in fine weather, the nozzle rain-guard device 30 is put away. To be more specific, as shown in FIG. 4 and FIG. 5, the nozzle cover 31 and the chute cover 32 are unfastened, and the vertical flange parts 46 of the chute cover 32 are unfastened. As a result, the chute cover 32 is disassembled in two, and easily detached from the nozzle 8.

After this, as shown in FIG. 7, the wire 39 of the lifting device 38 is wound up. By this means, the joining part 35 is raised, and the bellows part 34 is pushed up by the joining part 35 and folded. Consequently, the length of the lower end part of the nozzle 8 that is exposed increases, and the lower end part of the nozzle 8 can be easily seen from the operator room provided in a high location such as the boom 6. By this means, the work of loading cargo aboard can be performed at ease without sacrificing the workability.

Figure 10:
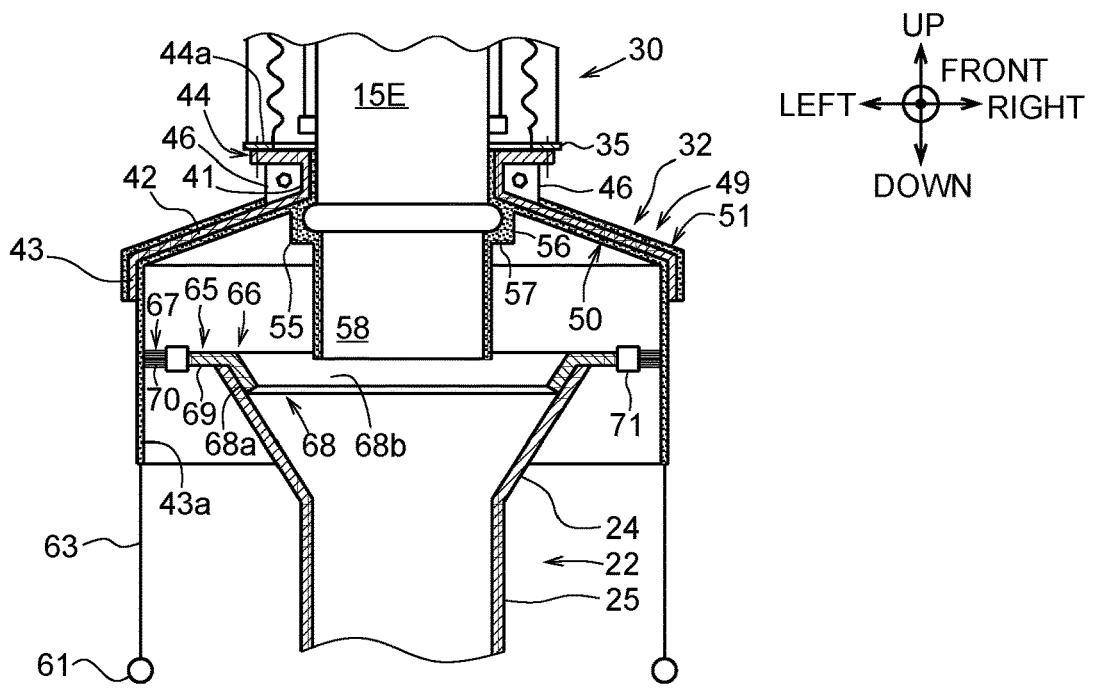
FIG. 10 is a front cross-sectional view of a main part of a rain-guard device for a nozzle, according to another embodiment.

Although an embodiment of the present disclosure has been described above in detail, the present disclosure can also be carried out in other embodiments such as the following:

(1) As shown in FIG. 10, the rain-guard device 30 for the nozzle may include a water-proof member 65, which seals the space between the chute 22 and the chute cover 32.

To be more specific, the water-proof member 65 has a fixed base part 66, which is provided in the chute 22, and a flexible part 67, which is provided in the fixed base part 66 to extend outward along the radial direction of the chute 22.

The fixed base part 66 is made of a non-conductive material such as resin. The fixed base part 66 has a base part 68 inside the cylinder, which is formed in a cylindrical shape, and in which, furthermore, the outer peripheral surface 68a is inclined so as to follow the inner periphery of the upper end part of the chute 22, and a base part 69 outside the cylinder, which extends radially outward from the base part 68 inside the cylinder, and which, furthermore, is formed to extend horizontally, and mounted on the chute 22. The inner peripheral surface 68b of the base part 68 inside the cylinder is inclined at the same angle as the inner periphery of the upper end part of the chute 22. The base part 69 outside the cylinder extends radially outward from the upper end of the chute 22.

Furthermore, a planting part 71 for planting brush bristles 70, which will be described later, is formed, at the outer peripheral end of the base part 69 outside the cylinder.

The planting part 71 is made of a non-conductive material such as resin, and formed in an annular shape along the outer periphery of the base part 69 outside the cylinder.

The flexible part 67 is formed by densely planting the brush bristles 70 in the planting part, to extend radially outward. The outer diameter of the flexible part 67 is set to be equal to or bigger than the inner diameter of the lower extension part 43. By this means, the tip of the flexible part 67 abuts on the inner peripheral surface 43a of the insulating part 54 inside the lower extension part, and the space between the chute 22 and the chute cover 32 is sealed. The brush bristles 70 that are planted densely and form the flexible part 67 allow air to pass while preventing water from passing. Consequently, the flexible part 67 can release the pressure inside the hold 7 due to loading while preventing the rainwater from seeping in the nozzle cover 31. Then, the flexible part 67 prevents dust from leaking from between the chute 22 and the insulating part 54 inside the lower extension part. To be more specific, the brush bristles 70 that are planted densely allow air to pass, while catching dust particles. Consequently, it is possible to more effectively prevent dust from leaking. The brush bristles 70 are made of a non-conductive material such as resin. Note that, when the flexible part 67 abuts on the inner peripheral surface 43a of the insulating part 54 inside the lower extension part, the flexible part 67 bends moderately and fits in the insulating part 54 inside the lower extension part, and the flexible part 67 is not limited to the brush bristles 70 as long as it is pressed against the inner peripheral surface 43a of the insulating part 54 inside the lower extension part. The flexible part 67 may be made of flexible soft resin such as urethane foam or rubber.

Figure 11:
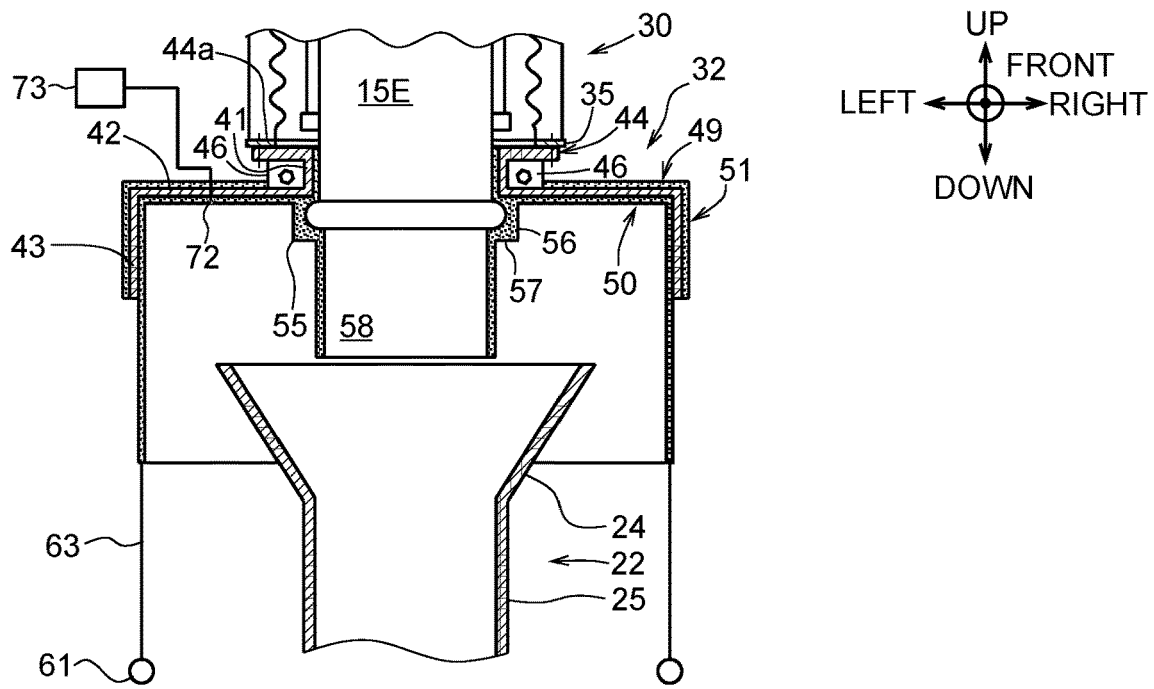
FIG. 11 is a front cross-sectional view of a main part of a rain-guard device for a nozzle, according to another embodiment.

(2) The umbrella part 42 is inclined to go downward as the umbrella part 42 extends further outward along the radial direction, but this is by no means limiting. As shown in FIG. 11, the umbrella part 42 may extend in the horizontal direction.

(3) As shown in FIG. 11, a camera 72 and a light (not shown) for photographing the chute 22 may be provided inside the chute cover 32. In this case, the camera 72 may be connected to a display 73 for showing the images photographed by the camera 72 to the operator of the shiploader 1 by wire or wirelessly. When the nozzle 8 is arranged on the chute 22, the nozzle 8 is positioned, by watching the image on the display 73, so that the nozzle 8 can be placed on the chute 22 easily and accurately.

Figure 12:
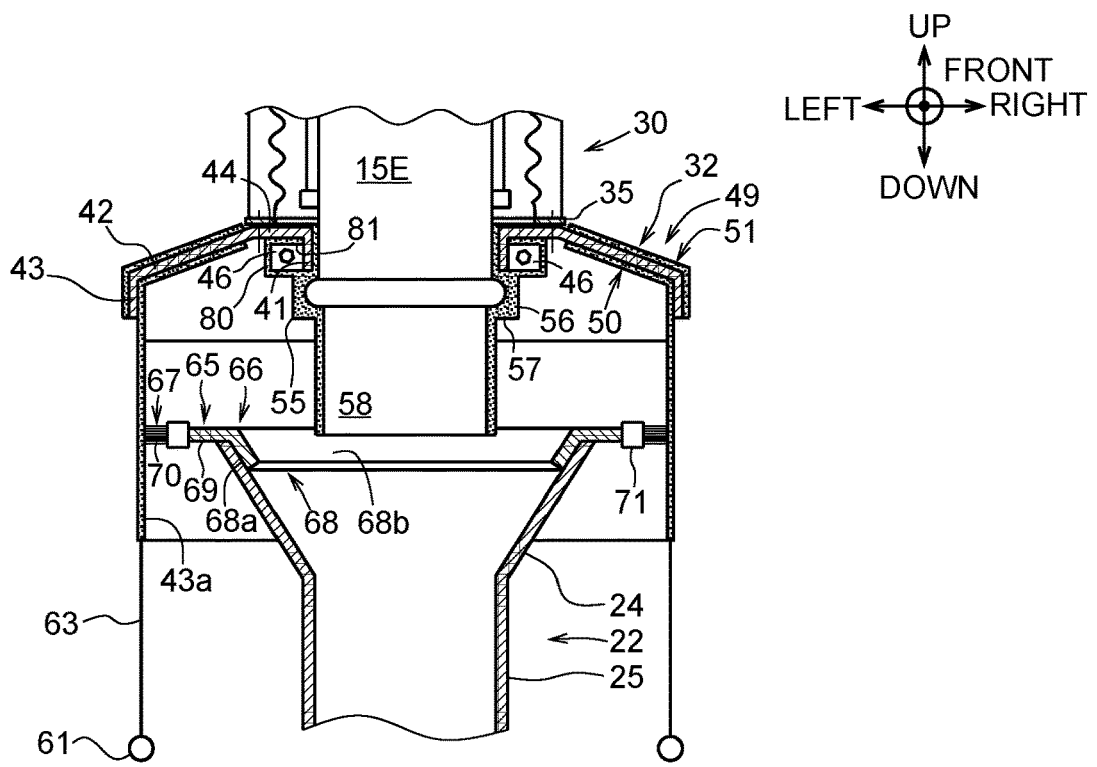
FIG. 12 is a front cross-sectional view of a main part of a rain-guard device for a nozzle, according to another embodiment.

(4) As shown in FIG. 12, the vertical flange part 46 may be placed inside (below) the umbrella part 42. This allows a worker on the ground to get inside the umbrella part 42, and reach the vertical flange part 46 with his/her hands. Consequently, the chute cover 32 can be installed easily. Furthermore, in this case, the umbrella part 42 may be connected to the outer peripheral end of the flange part 44 integrally. In addition, the inner surface insulating part 50 may additionally have a vertical flange insulating part 80, which covers the outer edge of the vertical flange part 46, and a flange insulating part 81, which covers the lower surface of the flange part 44.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A rain-guard device for a nozzle, comprising:
    a nozzle cover, which covers an outer periphery of a nozzle of a shiploader;
    a chute cover, which is provided in a lower end part of the nozzle, and covers the chute provided on a hatch opening from above; and
    wherein a seal member is provided to seal between the chute and the chute cover.

2. The rain-guard device for the nozzle according to claim 1, wherein a guide cylinder part for guiding cargo discharged from the nozzle to the chute is formed in the chute cover.

3. The rain-guard device for the nozzle according to claim 1, wherein the seal member comprises a fixed base part, which is provided in the chute, and a flexible part, which is provided in the fixed base part to extend outward along a radial direction of the chute.

4. The rain-guard device for the nozzle according to claim 1, further comprising:
    a landmark part, which is hung from an outer peripheral part of the chute cover; and
    a target, which is placed around the chute for positioning the landmark part.

5. The rain-guard device for the nozzle according to claim 1, wherein:
    a camera for photographing the chute is provided inside the chute cover; and
    a display for showing an image photographed by the camera to an operator of the shiploader is connected to the camera by wire or wirelessly.

6. The rain-guard device for the nozzle according to claim 1, wherein the chute cover comprises an insulator on its surface.

7. The rain-guard device for the nozzle according to claim 6, wherein a guide cylinder part for guiding cargo discharged from the nozzle to the chute is formed in the chute cover.

8. The rain-guard device for the nozzle according to claim 1, wherein the nozzle cover comprises:
- a fixed part, which is fixed liquid-tight to an outer peripheral part of the nozzle;
- a bellows part, which is provided in the fixed part to extend downward, and formed so as to expand and contract in a vertical direction; and
- a joining part, which is provided at a lower end of the bellows part, and connected liquid-tight to the chute cover.

9. The rain-guard device for the nozzle according to claim 8, wherein the chute cover comprises an insulator on its surface.

10. The rain-guard device for the nozzle according to claim 8, wherein a guide cylinder part for guiding cargo discharged from the nozzle to the chute is formed in the chute cover.

11. The rain-guard device for the nozzle according to claim 8, further comprising:
- a landmark part, which is hung from an outer peripheral part of the chute cover; and
- a target, which is placed around the chute for positioning the landmark part.

12. The rain-guard device for the nozzle according to claim 1, wherein:
- the chute cover is detachably provided in the lower end part of the nozzle and the nozzle cover; and
- the rain-guard device for the nozzle comprises a lifting device, which lifts a lower end of the nozzle cover.

13. The rain-guard device for the nozzle according to claim 12, wherein the chute cover comprises an insulator on its surface.

14. The rain-guard device for the nozzle according to claim 12, wherein a guide cylinder part for guiding cargo discharged from the nozzle to the chute is formed in the chute cover.

15. The rain-guard device for the nozzle according to claim 12, further comprising:
- a landmark part, which is hung from an outer peripheral part of the chute cover; and
- a target, which is placed around the chute for positioning the landmark part.

* * * * *